United States Patent
Suga

(10) Patent No.: US 10,509,233 B2
(45) Date of Patent: Dec. 17, 2019

(54) SPECKLE REDUCING DEVICE AND PROJECTOR

(71) Applicant: NIKON CORPORATION, Minato-ku, Tokyo (JP)

(72) Inventor: Akinobu Suga, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 15/969,761

(22) Filed: May 2, 2018

(65) Prior Publication Data

US 2018/0246340 A1  Aug. 30, 2018

Related U.S. Application Data

(60) Division of application No. 14/886,046, filed on Oct. 17, 2015, now Pat. No. 9,964,774, which is a
(Continued)

(30) Foreign Application Priority Data

Sep. 29, 2010 (JP) .................................. 2010-219079
Sep. 29, 2010 (JP) .................................. 2010-219080

(51) Int. Cl.
    *G02B 27/48* (2006.01)
    *G02B 27/28* (2006.01)
    (Continued)

(52) U.S. Cl.
    CPC .......... *G02B 27/48* (2013.01); *G02B 5/3083* (2013.01); *G02B 27/283* (2013.01);
    (Continued)

(58) Field of Classification Search
    CPC . G02B 7/00; G02B 26/08; G02B 3/00; G02B 27/10; G02B 27/48; G02B 27/286;
    (Continued)

(56) References Cited

U.S. PATENT DOCUMENTS 7,758,192 B2  7/2010  Matsubara
8,414,128 B2  4/2013  Hsiung
(Continued)

FOREIGN PATENT DOCUMENTS

JP  07-335523 A  12/1995
JP  2001-296503 A  10/2001
(Continued)

OTHER PUBLICATIONS

Office Action dated Jul. 17, 2012 in Japanese Patent Application No. 2010-219079.
(Continued)

*Primary Examiner* — Sultan Chowdhury
*Assistant Examiner* — Danell L Owens
(74) *Attorney, Agent, or Firm* — Shapiro, Gabor and Rosenberger, PLLC

(57) ABSTRACT

A speckle reducing device includes: a polarization splitter element with a polarization splitter portion that splits incident light into first and second light containing a first and a second component respectively, which outputs the first and the second light along different directions; a first reflecting member that reflects the first light to reenter the polarization splitter element; a first conversion member disposed between the first reflecting member and the polarization splitter element, which converts the first light to third light containing the second component; a second reflecting member that reflects the third light to reenter the polarization splitter element; and a second conversion member disposed between the second reflecting member and the polarization splitter element, which converts the third light to fourth light containing the first component, wherein: the polarization splitter element outputs the second and the fourth light along one direction.

7 Claims, 14 Drawing Sheets

Related U.S. Application Data continuation of application No. 13/248,378, filed on Sep. 29, 2011, now Pat. No. 9,182,608.

(51) Int. Cl.
  *G03B 21/14* (2006.01)
  *G03B 21/40* (2006.01)
  *H04N 9/31* (2006.01)
  *G03B 21/20* (2006.01)
  *G02B 5/30* (2006.01)

(52) U.S. Cl.
  CPC .......... *G02B 27/286* (2013.01); *G03B 21/14* (2013.01); *G03B 21/208* (2013.01); *G03B 21/2033* (2013.01); *G03B 21/2073* (2013.01); *G03B 21/40* (2013.01); *H04N 9/3161* (2013.01)

(58) Field of Classification Search
  CPC ..... G02B 5/3083; G02B 27/283; Y10T 29/49; G03B 21/2033; G03B 21/208; G03B 21/2073; G03B 21/40; G03B 21/14; H04N 9/3161
  See application file for complete search history.

(56) References Cited

U.S. PATENT DOCUMENTS

| | | | |
|---|---|---|---|
| 9,182,608 B2 | 11/2015 | Suga | |
| 2005/0134825 A1 | 6/2005 | Schuster | |
| 2008/0123056 A1 | 5/2008 | Matsubara | |
| 2011/0007392 A1 | 1/2011 | English et al. | |
| 2011/0149547 A1 | 6/2011 | Bruzzone et al. | |
| 2011/0304828 A1 | 12/2011 | Khechana et al. | |
| 2012/0019787 A1 | 1/2012 | Yamauchi et al. | |
| 2012/0120375 A1 | 5/2012 | Kilcher et al. | |

FOREIGN PATENT DOCUMENTS

| | | | | |
|---|---|---|---|---|
| JP | 2003-521740 A | 7/2003 | | |
| JP | 2004-527801 T | 9/2004 | | |
| JP | 2008-134271 A | 6/2008 | | |
| JP | 2008-164271 A | 7/2008 | | |
| JP | 2008-180650 A | 8/2008 | | |
| JP | 2008-309827 A | 12/2008 | | |
| JP | 4245041 B2 | 1/2009 | | |
| WO | WO 01/57581 A2 | 8/2001 | | |
| WO | WO 2007/072359 A2 | 6/2007 | | |
| WO | WO 2009/085856 A1 | 7/2009 | | |
| WO | WO 2010127694 A1 * | 11/2010 | ............. | G02B 7/003 |

OTHER PUBLICATIONS

Office Action dated Jul. 17, 2012 in Japanese Patent Application No. 2010-219080.
Office Action dated Aug. 21, 2015, in Chinese Patent Application No. 2011102963005.
Office Action dated Dec. 29, 2018, in Chinese Patent Application No. 201610457951.0.
Office Action dated Apr. 26, 2018, in Chinese Patent Application No. 201610457951.0.
Office Action dated Aug. 12, 2019, in Chinese Patent Application No. 201610457951.0.
English translation of Office Action dated Apr. 26, 2018, in Chinese Patent Application No. 201610457951.0.

* cited by examiner

SPECKLE REDUCING DEVICE AND PROJECTOR

INCORPORATION BY REFERENCE

The disclosures of the following priority applications are herein incorporated by reference:
Japanese Patent Application No. 2010-219079 filed Sep. 29, 2010
Japanese Patent Application No. 2010-219080 filed Sep. 29, 2010

BACKGROUND OF THE INVENTION

Field of the Invention

The present invention relates to a speckle reducing device and a projector.

Description of Related Art

When coherent light such as light from a laser light source is used to illuminate a rough surface, an irregular speckle pattern (referred to as speckle noise), attributable to interference of light fluxes diffused at various points of the rough surface, which assume complex phase relations to one another, may be formed. Japanese Laid Open Patent Publication No. 2001-296503 proposes a method for reducing speckle noise which is bound to adversely effect illumination provided by a laser light source for an exposure apparatus, a projector or the like.

SUMMARY OF THE INVENTION

In the method of the related art, two different optical path lengths are achieved by using to two PBSs (polarization beam splitters) and one return prism. There is thus an issue in that it is difficult to provide the system as a compact unit while assuring the required optical path space.

According to the 1st aspect of the present invention, a speckle reducing device comprises: a polarization splitter element equipped with a polarization splitter portion that splits incident light into first light containing a first component and second light containing a second component, which outputs the first light and the second light along different directions; a first reflecting member that reflects the first light output from the polarization splitter element, thereby directing the first light to reenter the polarization splitter element; a first conversion member disposed between the first reflecting member and the polarization splitter element, which converts the first light having been reflected by the first reflecting member to third light containing the second component; a second reflecting member that reflects the third light, which, after reentering the polarization splitter element, is output from the polarization splitter element, thereby directing the third light to reenter the polarization splitter element yet again; and a second conversion member disposed between the second reflecting member and the polarization splitter element, which converts the third light having been output from the polarization splitter element to fourth light containing the first component, wherein: the polarization splitter element outputs the second light and the fourth light along one direction.

According to the 2nd aspect of the present invention, incident light of a speckle reducing device according to the 1st aspect may travel to the first reflecting member, the first conversion member, the second reflecting member and the second conversion member perpendicular to the first reflecting member, the first conversion member, the second reflecting member and the second conversion member.

According to the 3rd aspect of the present invention, it is preferred that a speckle reducing device comprises: two speckle reducing devices according to theist aspect and a phase plate, wherein: the second light and the fourth light output along one direction from a first speckle reducing device are directed to enter a second speckle reducing device via the phase plate.

According to the 4th aspect of the present invention, it is preferred that in a speckle reducing device according to the 3rd aspect, an absolute value of a difference obtained by subtracting a sum of a first air-converted length of a path extending between the first reflecting member and the polarization splitter portion in the second speckle reducing device, and a second air-converted length of a path extending between the second reflecting member and the polarization splitter portion in the second speckle reducing device from a sum of the first air-converted length of a path extending between the first reflecting member and the polarization splitter portion in the first speckle reducing device and a second air-converted length of a path extending between the second reflecting member and the polarization splitter portion in the first spectral reducing device, is greater than half a coherence length of the incident light.

According to the 5th aspect of the present invention, it is preferred that in a speckle reducing device according to the 4th aspect, the difference between the first speckle reducing device and the second speckle reducing device is created by varying at least one of; a material used to constitute the polarization splitter element or a size of the polarization splitter element, a distance between the first reflecting member and the polarization splitter element, and a distance between the second reflecting member and the polarization splitter element, from one speckle reducing device to another.

According to the 6th aspect of the present invention, it is preferred that in a speckle reducing device according to the 3rd aspect, the first reflecting member, the first conversion member, the second reflecting member and the second conversion member are each configured as part of both the first speckle reducing device and the second speckle reducing device.

According to the 7th aspect of the present invention, a speckle reducing device according to the 1st aspect may further comprise: a first half mirror member disposed between the first reflecting member and the polarization splitter element, which causes multiple reflection of the first light traveling between the first reflecting member and the first half mirror member.

According to the 8th aspect of the present invention, it is preferred that in a speckle reducing device according to the 7th aspect, incident light travels to the first reflecting member, the first conversion member, the second reflecting member and the second conversion member perpendicular to the first reflecting member, the first conversion number, the second reflecting member and the second conversion member.

According to the 9th aspect of the present invention, a speckle reducing device according to the 7th aspect may further comprise: a second half mirror member disposed between the second reflecting member and the second conversion member, which causes multiple reflection of the third light traveling between the second reflecting member and the second half mirror member.

According to the 10th aspect of the present invention, it is preferred that in a speckle reducing device according to the 9th aspect, a first air-converted length of a path between the first reflecting member and the first half mirror member and a second air-converted length of a path between the second reflecting member and the second half mirror are both greater than half a coherence length of the incident light.

According to the 11th aspect of the present invention, a speckle reducing device may comprise: two speckle reducing devices according to the 7th aspect; and a third conversion member that enables component switch between the second light containing the second component and the fourth light containing the first component, wherein: the second light and the fourth light output along one direction from a first speckle reducing device are directed to enter a second speckle reducing device via the third conversion member.

According to the 12th aspect of the present invention, it is preferred that in a speckle reducing device according to the 11th aspect, the first reflecting member, the first conversion member, the second reflecting member and the second conversion member are each configured as part of both the first speckle reducing device and the second speckle reducing device.

According to the 13th aspect of the present invention, a projector comprises: a laser light source; and a spectral reducing device according to the 1st aspect, wherein: light emitted from the laser light source enters the speckle reducing device.

According to the present invention, a speckle reducing device ideal for miniaturization that can readily be provided as a compact unit is achieved.

DESCRIPTION OF PREFERRED EMBODIMENTS

First Embodiment

Figure 1:
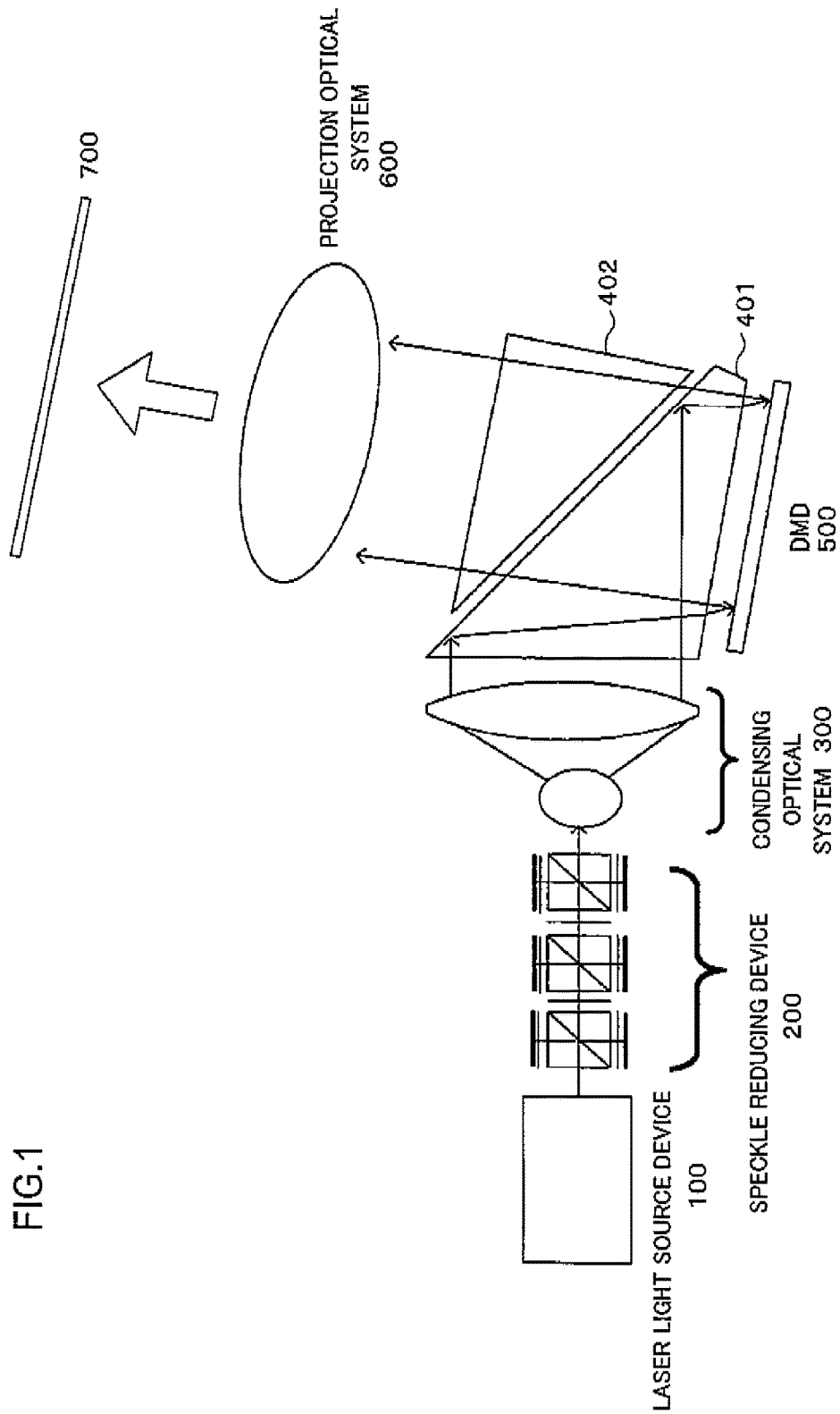
FIG. 1 shows the essential structure pertaining to the optical systems in a projector equipped with a speckle reducing device achieved in an embodiment of the present invention.

The following is a description of an embodiment of the present invention, given in reference to drawings. FIG. 1 shows the essential structure pertaining to the optical systems in a projector equipped with the speckle reducing device achieved in an XS embodiment of the present invention. The projector in FIG. 1 includes a laser light source device 100, a speckle reducing device 200, a condensing optical system 300, total reflecting prisms 401 and 402, a reflection-type display element 500 and a projection optical system 600.

The laser light source device 100 may include, for instance, one chip-type LEDs that emit green light and two chip-type LEDs each constituted with an LED chip that emits red light and an LED chip that emits blue light. The laser light source device 100 is a light source for three primary colors of light.

The speckle reducing device 200 achieves two different optical path lengths by assuming a structure that includes a PBS (polarization beam splitter) disposed between two reflecting mirrors. By superimposing speckles in two patterns formed with light having traveled through the different optical paths, the speckle noise contrast can be reduced to $1/(\sqrt{2})$. In the example presented in FIG. 1, blocks, at each of which two different optical path lengths are achieved, are set side-by-side in a three-stage structure so as to reduce the speckle noise contrast to $1/(\sqrt{8})$. The speckle reducing device 200 will be described in detail later.

The condensing optical system 300 condenses the light provided from the laser light source device 100 and illuminates an illumination target surface of the reflection-type display element 500 so as to provide uniform illuminating light with a minimum of unevenness at the illumination target surface of the reflection-type display element 500. The total reflecting prisms include the prism 401 and the prism 402. The illuminating light having traveled from the condensing optical system 300 is reflected at the prism 401 and is directed toward the reflection-type display element 500.

The reflection-type display element 500 may be constituted with, for instance, a DMD (digital micro-mirror device). A DMD includes movable micro-mirror faces (micro-mirrors) corresponding to pixels, which are disposed in a two-dimensional array. The DMD can be switched to a state in which the illuminating light is reflected toward the total reflecting prism 401 or to a state in which the illuminating light is reflected toward an absorptive member present within the DMD by driving electrodes disposed at the bottom of the micro-mirrors. The micro-mirrors can be individually driven independently of one another and thus, illuminating light reflection can be controlled in correspondence to each display pixel.

The DMD normally operates under binary control, so as to assume the state in which the illuminating light is reflected toward the total reflecting prism 401 or the state in which the illuminating light is absorbed therein. The DMD makes rapid switchover between the states corresponding to the two different values so as to express varying levels of density through pulse width modulation (PWM) with which the time ratio of the reflecting state and the absorbing state is controlled. By emitting light from the LED chips corresponding to the various colors within the laser light source device 100 in specific color sequence, a full-color display can be provided via a single reflection-type display element 500. The modulated light from the DMD is transmitted through the prisms 401 and 402 and the transmitted light then travels to the projection optical system 600. A full-color image is thus projected by the projection optical system 600 onto a screen 700.

Figure 2:
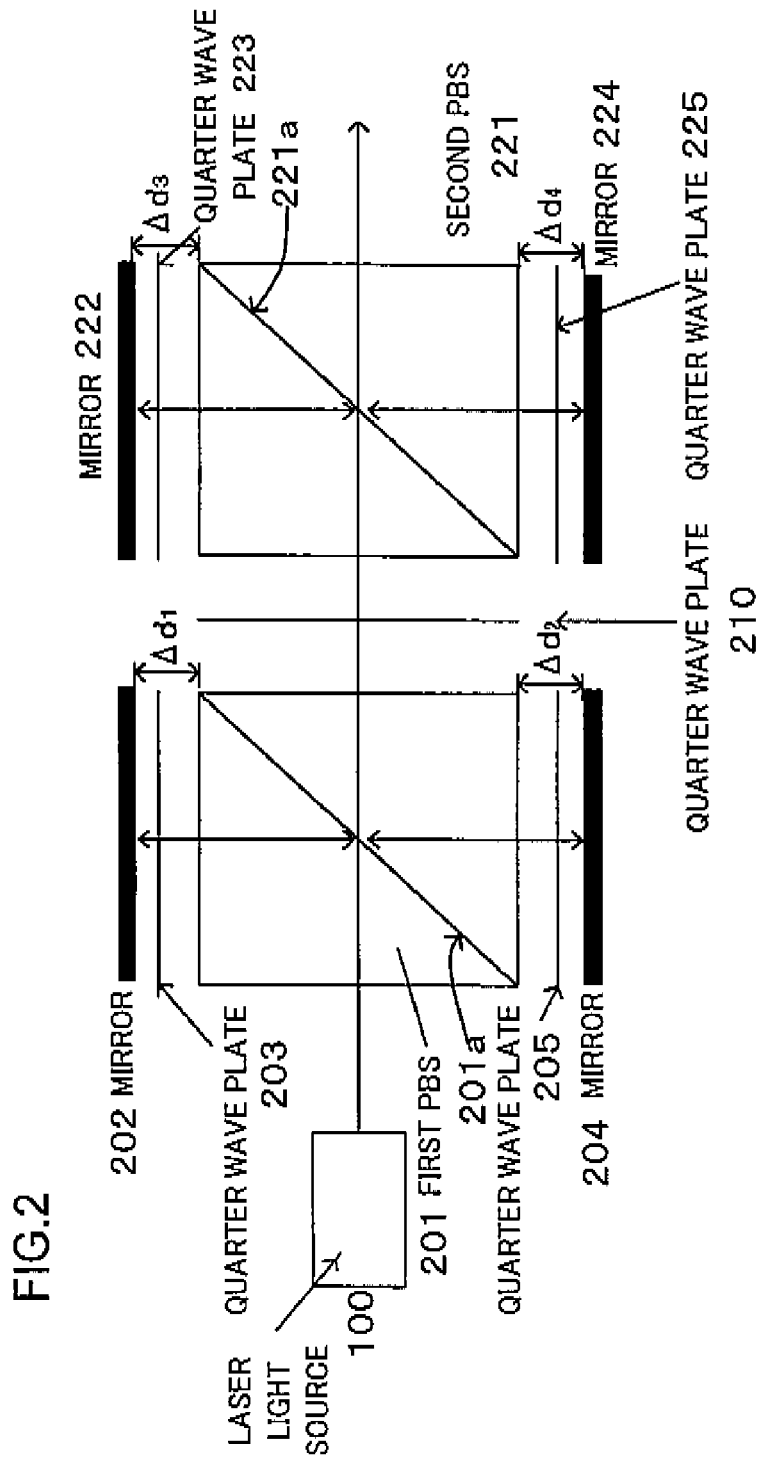
FIG. 2 is an enlarged view of the structure assumed in the speckle reducing device in a first embodiment, pertaining to optical systems installed over two stages at the speckle reducing device.

Since the embodiment is characterized by the structure of the speckle reducing device 200, the following description focuses on the speckle reducing device 200. FIG. 2 is an enlarged view of the structure of optical systems corresponding to two stages, which are part of the three-stage optical structure assumed in the speckle reducing device 200.

(Structure of First Block)

A first block, equivalent to the first-stage optical system in the speckle reducing device 200 (see FIG. 1), is first described. FIG. 2 shows a reflecting mirror 202 and a reflecting mirror 204 respectively disposed above and below a first PBS 201. The first PBS 201 and the reflecting mirror 202 are set apart from each other by a distance Δd1. The first PBS 201 and the reflecting mirror 204 are set apart from each other by a distance Δd2. The distances Δd1 and Δd2 are set equal to each other in the embodiment. A quarter wave plate 203 is disposed between the first PBS 201 and the reflecting mirror 202. A quarter wave plate 205 is disposed between the first PBS 201 and the reflecting mirror 204.

(Structure of Second Block)

A second block, equivalent to the second-stage optical system in the speckle reducing device 200 (see FIG. 1) is described next. A second PBS 221 is identical to the first PBS 201. A reflecting mirror 222 and a reflecting mirror 224 are respectively disposed above and below the second PBS 221. The second PBS 221 and the reflecting mirror 222 are set apart from each other by a distance Δd3. The second PBS 221 and the reflecting mirror 224 are set apart from each other by a distance Δd4. The distances Δd3, and Δd4 are set equal to the distances Δd1 and Δd2 (Δd3=Δd4=Δd1=Δd2) in the embodiment. A quarter wave plate 223 is disposed between the second PBS 221 and the reflecting mirror 222. A quarter wave plate 225 is disposed between the second PBS 221 and the reflecting mirror 224. A quarter wave plate 210 is disposed between the first PBS 201 and the second PBS 221. It is to be noted that the third-stage optical system, adopting a structure similar to those of the first block and the second block, is disposed to the right of the second PBS 221, with a quarter wave plate provided between the second block and the third block.

A circularly polarized light flux from the laser light source device 100 enters the left side surface of the first PBS 201. If the light flux from the laser light source device 100 is linearly polarized light, it will need to be converted to circularly polarized light via a quarter wave plate so that the circularly polarized light flux resulting from the conversion, entering through the left side surface of the first PBS 201, will contain both a P polarized light component and an S polarized light component in substantially equal amounts.

The P polarized light component in the light having entered the first PBS 201 is transmitted through a polarization splitter portion 201a and exits the first PBS 201 through its right side surface. The S polarized light component in the light having entered the first PBS 201 is reflected at the polarization splitter portion 201a and exits the first PBS 201 through the top surface thereof.

The polarized light component having exited the first PBS 201 through its top surface is reflected at the reflecting mirror 202 and reenters the first PBS 201 through the top surface of the first PBS 201. The polarized light component that has reentered the first PBS 201 as described above will have been transmitted through the quarter wave plate 203 twice and thus will have been converted from the S polarized light component to a P polarized light component. This P polarized light component is transmitted through the polarization splitter portion 201a and exits the first PBS 201 through the bottom surface thereof.

The polarized light component having exited the first PBS 201 through its bottom surface is reflected at the reflecting mirror 204 and reenters the first PBS 201 through the bottom surface of the first PBS 201. The polarized light component that has reentered the first PBS 201 yet again will have been transmitted through the quarter wave plate 205 twice and thus will have been converted from the P polarized light component to an S polarized light component. This S polarized light component is reflected at the polarization splitter portion 201a and exits the first PBS 201 through the right side surface thereof.

In the structure described above, the light constituted with the P polarized light component and the light constituted with the S polarized light component exit the first PBS 201 through its right side surface. The length of the optical path of the S polarized light component is greater than the length of the optical path of the P polarized light component by a distance equivalent to one trip back and forth between the reflecting mirror 202 and the reflecting mirror 204. As a result, speckles in two patterns formed through the two different optical paths are superimposed upon each other and the speckle noise contrast is reduced to $1/(\sqrt{2})$.

The light, having exited the first PBS 201 through its right side surface, enters the second PBS 201 through its left side surface via the quarter wave plate 210. Via the quarter wave plate 210, the P polarized light component and the S polarized light component are each converted to circularly polarized light. Namely, the light fluxes containing the two speckle patterns are each converted so as to assume a state in which it contains P polarized light and S polarized light in substantially equal amounts.

The light having entered the second PBS 221 through the left side surface travels through optical paths similar to those in the first PBS 201. Namely, the optical path of the light, initially entering the second PBS 221 as the S polarized light component, which travels over a distance that includes a round-trip between the reflecting mirror 222 and the reflecting mirror 224, is longer than the optical path of the light that initially enters the second PBS 221 as the P polarized light component. By disposing the first PBS 201 and the second PBS 221 over two stages, as described above, four speckle patterns formed through different optical paths can be superimposed upon one another. As a result, the speckle noise contrast is reduced to $1/\sqrt{2} \times 1/(\sqrt{2}) = \frac{1}{2}$.

By adding a similar third-stage optical system (not shown), eight speckle patterns formed through different optical paths can be superimposed upon one another. Consequently, the speckle noise contrast can be reduced to $1/\sqrt{2} \times 1/(\sqrt{2}) \times 1/(\sqrt{2}) = \frac{1}{2}\sqrt{2}$.

It is to be noted that the configuration shown in FIG. 2 includes the PBSs 201 and 221 each assuming rectangular parallelopiped shape and the quarter wave plates 203, 205, 210, 223 and 225 and the reflecting mirrors 202, 204, 222 and 224 each disposed perpendicular to an optical axis so as to allow light to enter or exit the corresponding device surface perpendicular to the particular device surface. The individual components are set with this positional arrangement so as to minimize the extent of angular widening that is bound to occur when different polarized light components, separated from each other by splitting the light at the polarization splitter surface 201a or 221a of the PBS 201 or 221, are combined on a single optical path.

While the speckle reducing device 200 described above includes structural blocks, in each of which two different optical path lengths are achieved, disposed side-by-side over three stages, the speckle reducing device may instead assume a single-stage structure or a two-stage structure. However, it will be obvious that the speckle noise contrast can be reduced more effectively via structural blocks disposed over a greater number of stages.

The following advantages are achieved through the embodiment described above.

(1) The speckle reducing device includes the PBS 201, which splits incident light into first-component light (S polarized light component) and second-component light (P polarized light component) at its polarization splitter portion 201a and outputs the first-component light and the second-component light along different directions, the reflecting mirror 202 that reflects the first-component light (S polarized light component) having exited the PBS 201 to allow the light to reenter the PBS 201, the quarter wave plate 203 disposed between the reflecting mirror 202 and the PBS 201, via which the light to reenter the PBS 201 is converted to second-component light (P polarized light), the reflecting mirror 204 that reflects the second-component light (P polarized light component) having reentered the PBS 201 and then exited the PBS 201 so as to allow the light to reenter the PBS 201 yet again, and the quarter wave plate 205 disposed between the reflecting mirror 204 and the PBS 201, via which the light to reenter the PBS 201 yet again is converted to first-component light (S polarized light component). At this speckle reducing device, the second-component light (P polarized light component) obtained by splitting the incident light and the first-component light (S polarized light component) having reentered the PBS 201 for the second time are made to exit the PBS 201 along the same direction. As a result, a speckle reducing device that reduces speckles by creating two different optical path lengths can be provided as a compact unit.

(2) At the speckle reducing device described in (1) above, the reflecting mirror 202, the quarter wave plate 203, the reflecting mirror 204 and the quarter wave plate 205 are each disposed so that incident light enters the corresponding device surface perpendicular to the particular device surface. As a result, the extent of angular spreading that is bound to occur when different polarized light components, having been separated from each other at the polarization splitter surface 201a of the PBS 201, join each other on a single optical path can be minimized.

(3) At the speckle reducing device that includes the first block, the second block and the quarter wave plate 210 and thus, the first-component light (S polarized light component) and the second-component light (P polarized light component) having exited the first block along the same direction enter the second block via the quarter wave plate 210. Via the first PBS 201 and the second PBS 221 disposed side-by-side over two stages, four speckle patterns formed through different optical paths are superimposed upon one another, making it possible to further reduce the speckle noise contrast. In other words, the speckle noise contrast can be reduced to a greater extent compared to the speckle noise contrast reduction achieved by assuming a single-stage structure.

In the embodiment described above, the S polarized light component in the light having entered each PBS is reflected at a reflecting mirror. As an alternative, the P polarized light component in the light having entered the PBS may then be reflected at a reflecting mirror.

(Variation 1)

Figure 3:
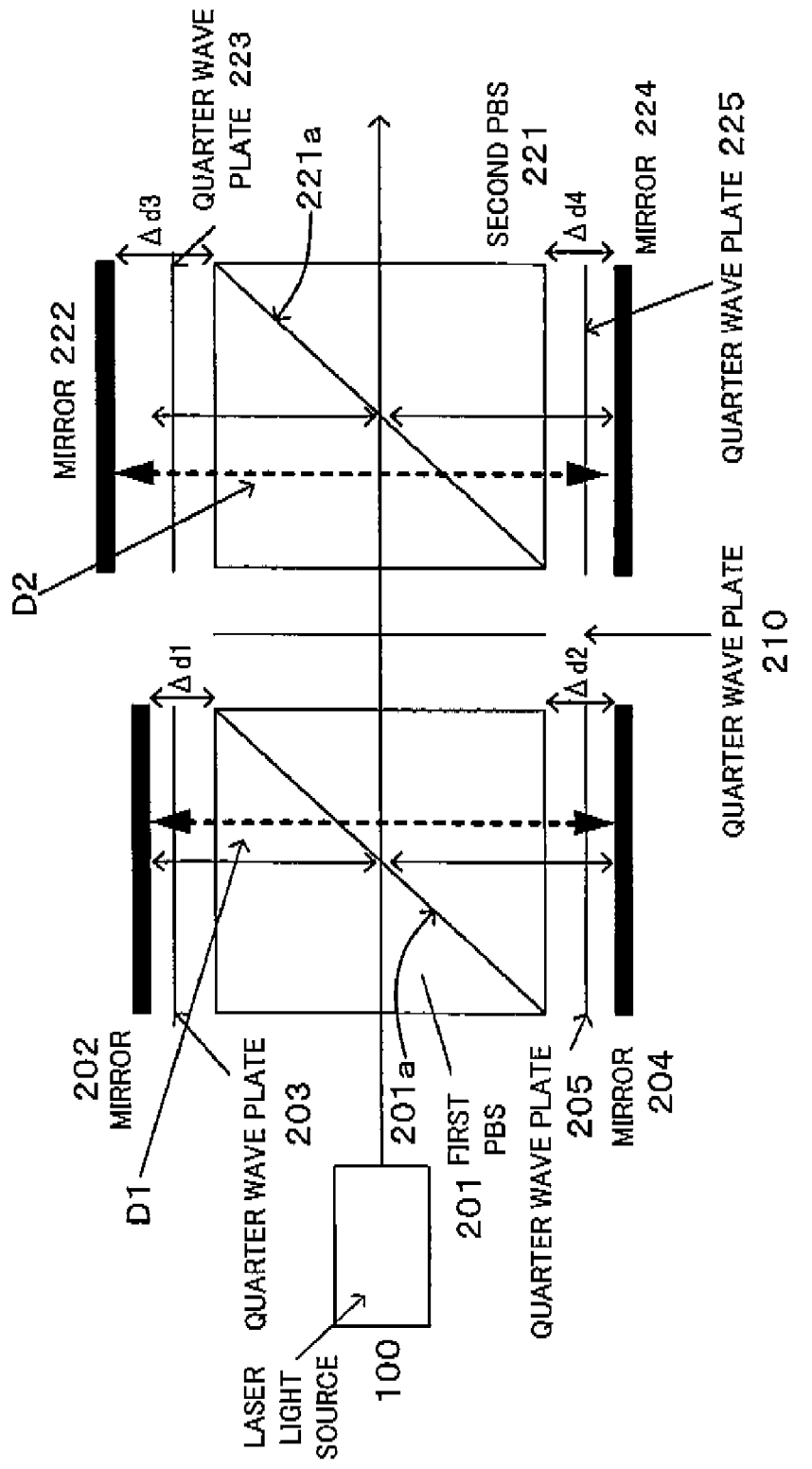
FIG. 3 presents examples of optical systems that may be included in a speckle reducing device achieved in variation 1.

FIG. 3 presents examples of optical systems that may be included in the speckle reducing device achieved in variation 1. The optical path through which light initially entering the first block as an S polarized light component travels in the first block and the optical path through which light initially entering the second block as an S polarized light component travels in the second block, may assume different lengths. Namely, a distance (indicated as an air-converted length) D1 setting apart the reflecting mirror 202 and the reflecting mirror 204, between which the first PBS 201 is present, and a distance (indicated as an air-converted length) D2 setting apart the reflecting mirror 222 and the reflecting mirror 224, between which the second PBS 221 is present, may be different. In variation 1, the second PBS 221 is set apart from the reflecting mirrors 222 and 224 by a greater distance, compared to the distance setting apart the first PBS 201 from the reflecting mirrors 202 and 204. Namely, a relationship expressed as; $\Delta d3 = \Delta d4 > \Delta d1 = \Delta d2$ is assumed. At the same time, the difference between the distances D1 and D2 is set equal to or greater than half the coherence length Lc of the light from the light source, as expressed in (1) below.

$$|D1 - D2| \geq Lc \quad (1)$$

The coherence length Lc can be approximated as expressed in (2) below. $\lambda$ and $\Delta\lambda$ in the expression below respectively represent the dominant wavelength of the light from the light source and the wavelength width of the light from the light source.

$$Lc = \lambda^2 / \Delta\lambda \quad (2)$$

For instance, when the dominant wavelength $\lambda$ and the wavelength width $\Delta\lambda$ of the light from the light source are respectively 530 nm and 0.1 nm, the coherence length Lc will be approximately 2.8 mm. Accordingly, |D1−D2| in this situation should be set equal to or greater than 1.4 mm. In variation 1, an incoherent relationship is assumed for light fluxes to be superimposed upon one another so as to more effectively reduce speckles, compared to the level of speckle reduction achieved with |D1−D2| set less than Lc/2.

(Variation 2)

In variation 1, the relationship expressed as $\Delta d3 = \Delta d4 > \Delta d1 = \Delta d2$ is assured, so as to achieve an air-converted length D1 at the first block and an air-converted length D2 at the second block which are different from each other. As an alternative, the difference between D1 and D2 may be created by varying the sizes of the first PBS 201 and the second PBS.

Figure 4:
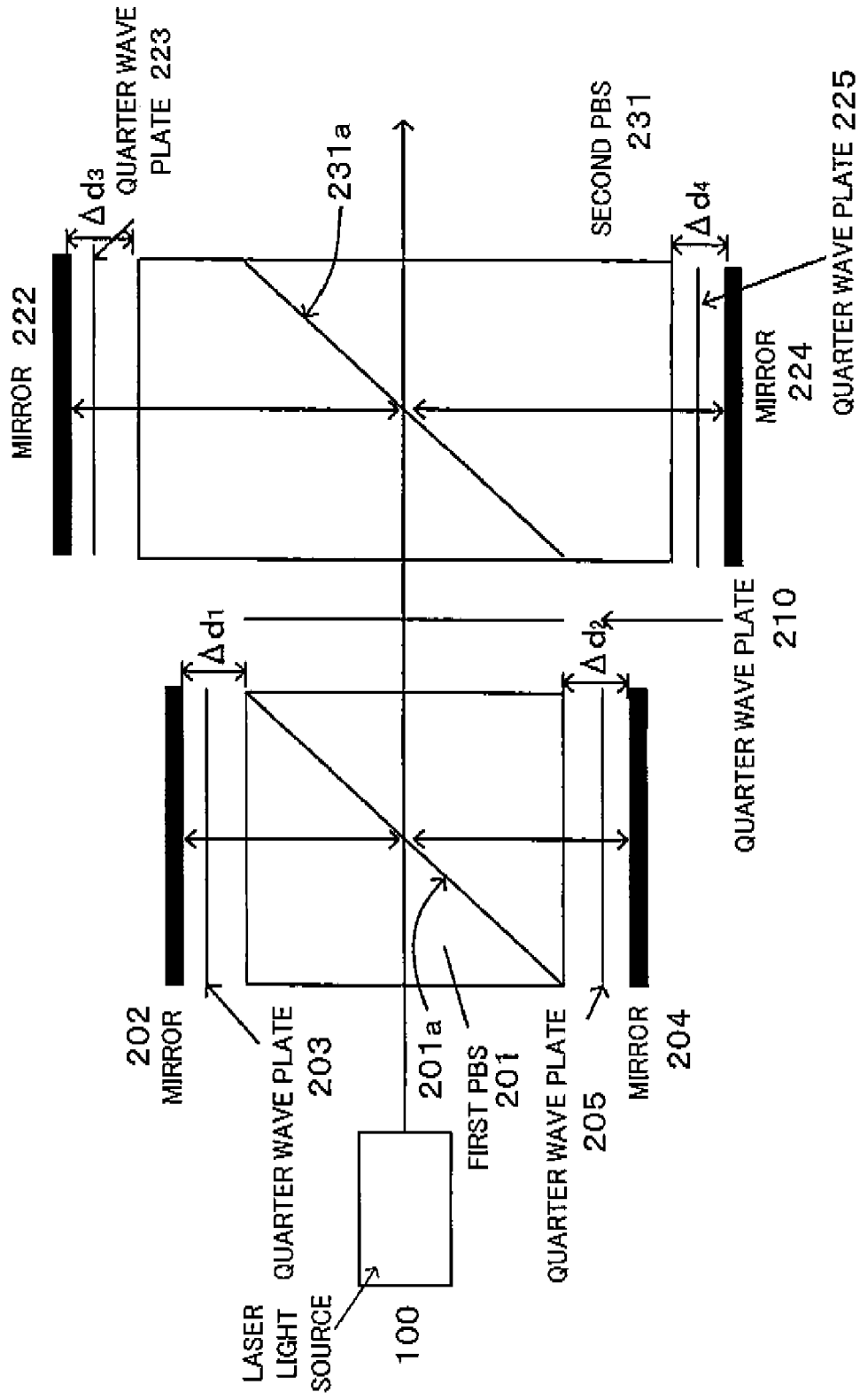
FIG. 4 presents examples of optical systems that may be included in a speckle reducing device achieved in variation 2.

FIG. 4 presents examples of optical systems that may be included in a speckle reducing device achieved in variation 2. FIG. 4 shows a second PBS 231, assuming a greater dimension, measured along the top-bottom direction, compared to the corresponding dimension of the first PBS 201 measured along the top-bottom direction. Through these measures, too, the distance (indicated as an air-converted length) D1 setting apart the reflecting mirror 202 and the reflecting mirror 204, between which the first PBS 201 is present, and the distance (indicated as an air-converted length) D2 setting apart the reflecting mirror 222 and the reflecting mirror 224, between which the second PBS 231 is present, can be varied from each other. It is to be noted that Δd1 and Δd2 in FIG. 4 respectively indicate the distance between the first PBS 201 and the reflecting mirror 202 and the distance between the first PBS 201 and the reflecting mirror 204. Furthermore, Δd3 and Δd4 respectively indicate the distance between the second PBS 231 and the reflecting mirror 222 and the distance between the second PBS 231 and the reflecting mirror 224. The distances Δd3, Δd4, Δd1 and Δd2 are all equal to one another (Δd3=Δd4=Δd1=Δd2) in variation 2. In variation 2, too, an incoherent relationship is assumed for light fluxes to be superimposed upon one another so as to more effectively reduce speckles, compared to the level of speckle reduction achieved with |D1−D2| set less than Lc/2.

(Variation 3)

Figure 5:
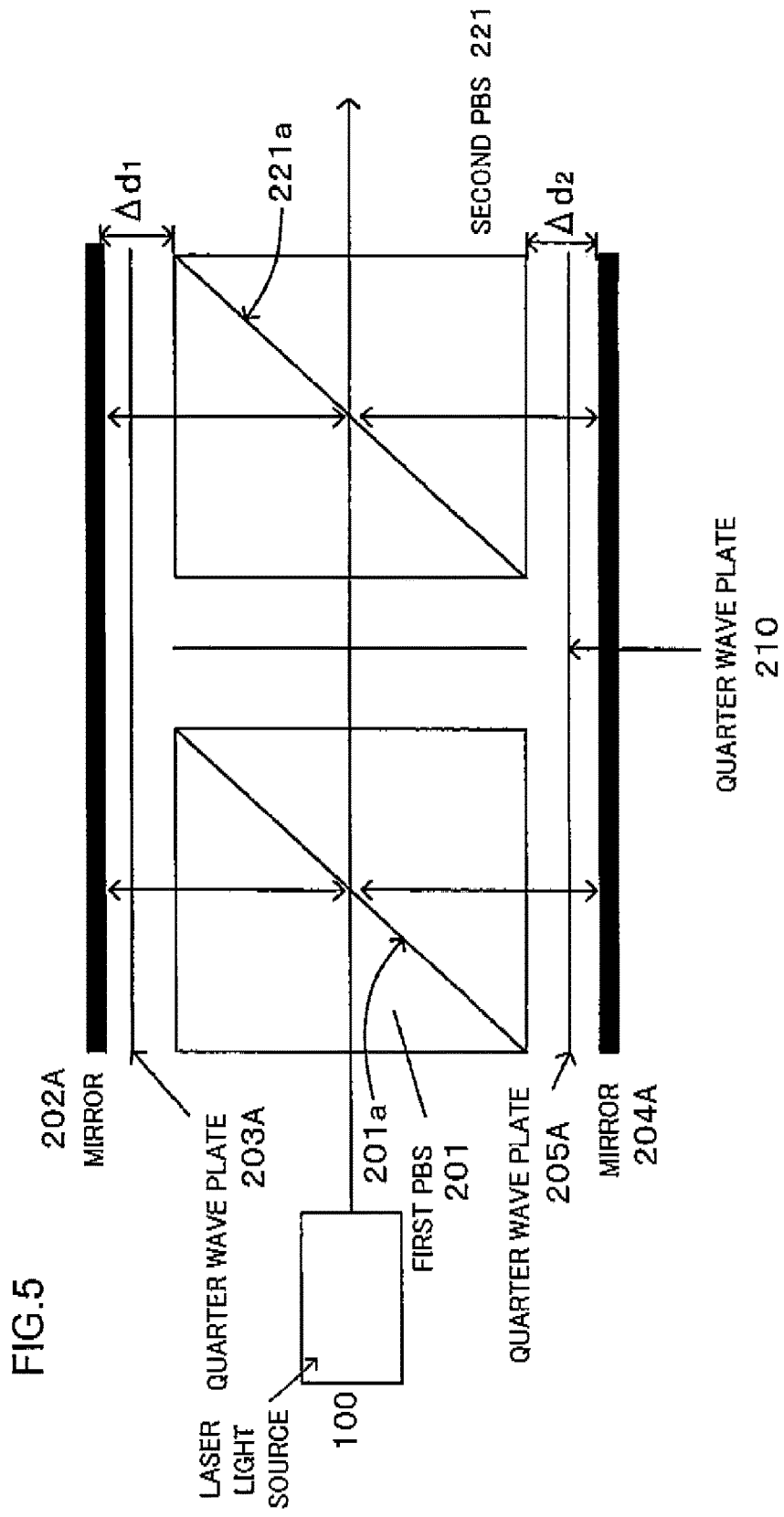
FIG. 5 presents examples of optical systems that may be included in a speckle reducing device achieved in variation 3.

A common reflecting mirror and the like may be disposed to be used in conjunction with both the first block and the second block. FIG. 5 presents examples of optical systems that may be included in the speckle reducing device achieved in variation 3. A reflecting mirror 202A, a reflecting mirror 204A, a quarter wave plate 203A and a quarter wave plate 205A in FIG. 5 are all commonly used in conjunction with both the first block and the second block. The first PBS 201 (the second PBS 221) is set apart from the reflecting mirror 202A by a distance Δd1. In addition, the first PBS 201 (the second PBS 221) is set apart from the reflecting mirror 204A by a distance Δd2. The distances Δd1 and Δd2 are set equal to each other in variation 3.

The speckle reducing device in variation 3, which includes common members shared by the first block and the second block, requires fewer components and can be manufactured through an assembly process executed at lower cost. For instance, a speckle reducing device adopting a structure with the quarter wave plates and the PBSs fitted inside a casing to which the mirrors are vapor-deposited, can be manufactured through fewer assembly steps. It is to be noted that by forming the first PBS 201 and the second PBS 221 with different glass materials, so that the first PBS 201 and the second PBS 221 assume different refractive indices, the air-converted length D1 corresponding to the first block and the air-converted length D2 corresponding to the second block can be varied from each other.

(Variation 4)

Figure 6:
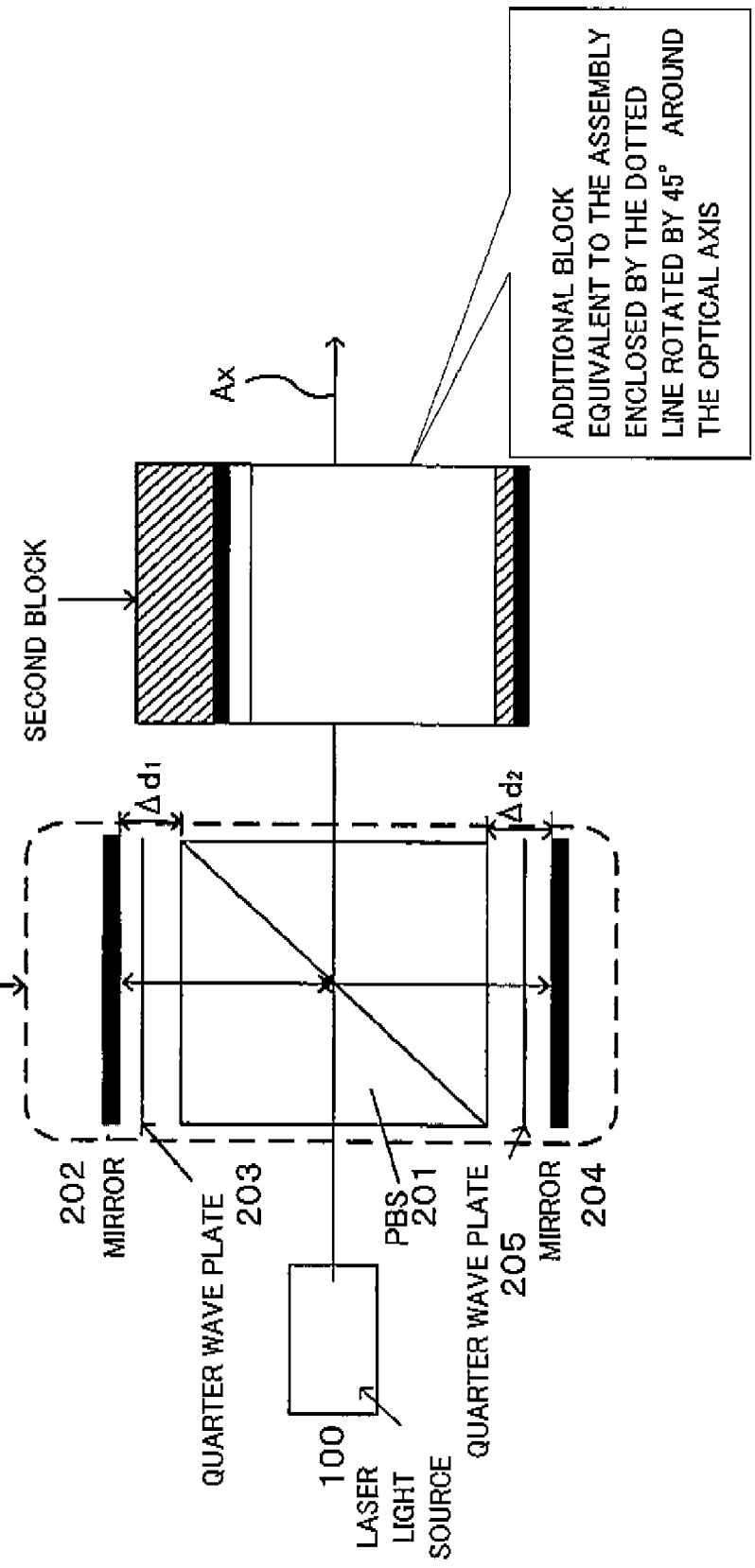
FIG. 6 presents examples of optical systems that may be included in a speckle reducing device achieved in variation 4.

Any of the second blocks structured as shown in FIGS. 2 through 4 may be rotated substantially by 45° around an optical axis Ax relative to the first block, so as to tilt the direction in which the light exiting the first PBS 201 through the right side surface thereof is polarized by approximately 45° relative to the polarization splitter surface of the second PBS in the second block. FIG. 6 presents examples of optical systems that may be included in the speckle reducing device achieved in variation 4.

In variation 4, the light containing the two speckle patterns, which exits the first block through the right side surface thereof to subsequently enter the second block, includes both a P polarized light component and an S polarized light component in substantially equal amounts. As a result, no quarter wave plate is required between the first block and the second block.

(Variation 5)

Figure 7:
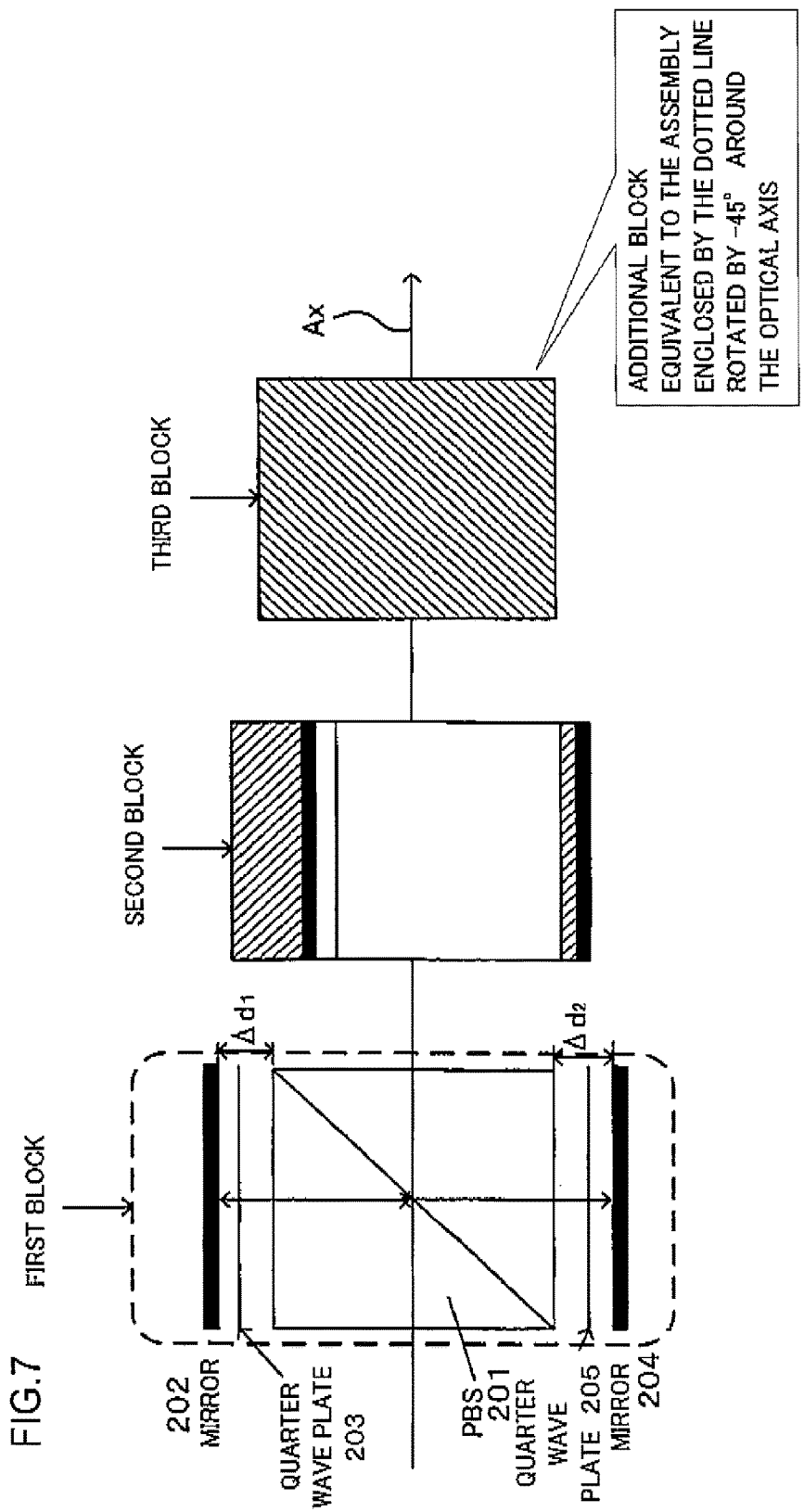
FIG. 7 presents examples of optical systems that may be included in a speckle reducing device achieved in variation 5.

The structure achieved in variation 4 may be adopted in a speckle reducing device with a three-stage structure by rotating the third block by approximately 45° around the optical axis Ax relative to the second block. FIG. 7 presents examples of optical systems that may be included in the speckle reducing device achieved in variation 5.

Second Embodiment

In reference to drawings, the speckle reducing device achieved in the second embodiment is described. The following description focuses on features differentiating the second embodiment from the first embodiment by assigning the same reference numerals to components identical to those in the first embodiment. Any feature that is not specially noted should be assumed to be identical to the corresponding feature in the first embodiment. The second embodiment is distinguishable from the first embodiment in that the first block and the second block each include a non-polarizing half mirror.

The second embodiment, too, is characterized by the structure adopted in the speckle reducing device and accordingly, the following description focuses on the speckle reducing device.

(Structure of First Block)

Figure 8:
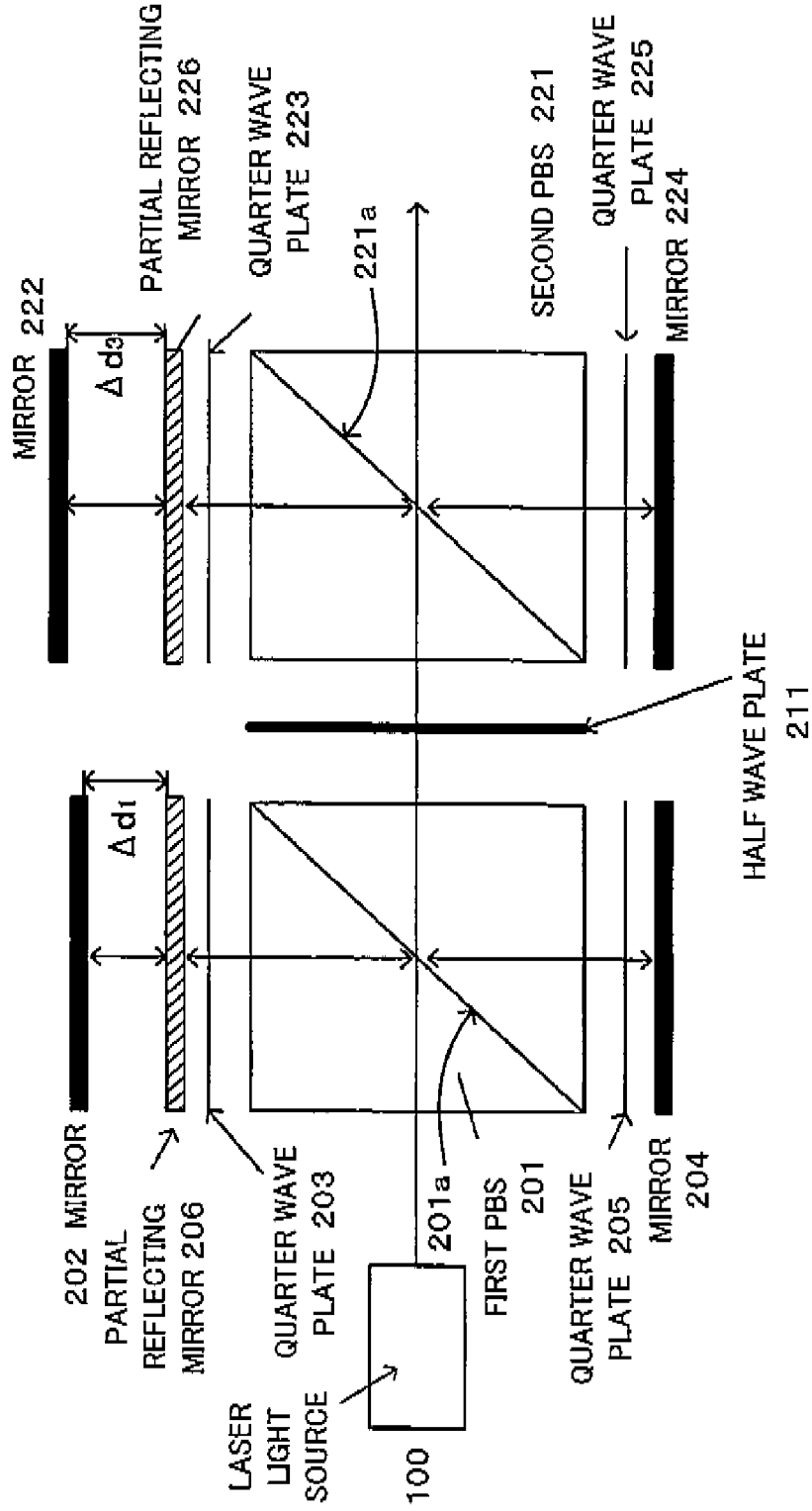
FIG. 8 is an enlarged view the structure assumed in the speckle reducing device in a second embodiment, pertaining to optical systems thereof installed over two stages at the speckle reducing device.

A first block, equivalent to the first-stage optical system in the speckle reducing device 200 (see FIG. 1) is first described. FIG. 8 shows a reflecting mirror 202 and a reflecting mirror 204 respectively disposed above and below a first PBS 201. Above the first PBS 201, a partial reflecting mirror 206 and a quarter wave plate 203 are disposed between the first PBS 201 and the reflecting mirror 202. The partial reflecting mirror 206 may be constituted with, for instance, a non-polarizing half mirror so as to ensure that no variance in the reflectance (transmittance) occurs due to a difference in the polarizing direction. The ratio of the transmittance and the reflectance at the non-polarizing half mirror does not need to be 50:50, and it may be, for instance, 30:70 or 60:40 instead. The partial reflecting mirror 206 is set apart from the reflecting mirror 202 by a distance Δd1. Below the first PBS 201, only a quarter wave plate 205 is disposed between the first PBS 201 and the reflecting mirror 204.

The distance Δd1 between the partial reflecting mirror 206 and the reflecting mirror 202 is set so that it assumes a relation to the coherence length Lc of the light from the light source expressed in (3) below.

$$\Delta d1 \geq Lc/2 \quad (3)$$

The coherence length Lc can be approximated as expressed in (2) below $$Lc = \lambda^2/\Delta\lambda \quad (2)$$

λ and Δλ in the expression above respectively represent the dominant wavelength of the light from the light source and the wavelength width of the light from the light source.

For instance, when the dominant wavelength λ and the wavelength width Δλ of the light from the light source are respectively 530 nm and 0.1 nm, the coherence length Lc will be approximately 2.8 mm. Accordingly, Δd1 in this situation should be set equal to or greater than 1.4 mm. An incoherent relationship is assumed for light fluxes to be superimposed upon one another so as to effectively reduce speckles.

(Structure of Second Block)

A second block, equivalent to the second-stage optical system in the speckle reducing device 200 (see FIG. 1) is described next. A second PBS 221 is identical to the first PBS 201. A reflecting mirror 222 and a reflecting mirror 224 respectively disposed above and below the second PBS 221. Above the second PBS 221, a partial reflecting mirror 226 and a quarter wave plate 223 are disposed between the second PBS 221 and the reflecting mirror 222. The partial reflecting mirror 226 may be constituted with a non-polarizing half mirror as explained earlier, so as to ensure that no variance in the reflectance (transmittance) occurs due to a difference in the polarizing direction. The partial reflecting mirror 226 is set apart from the reflecting mirror 222 by a distance Δd3. Δd1≠Δd3 is true in the embodiment. Below the second PBS 221, only a quarter wave plate 225 is disposed between the second PBS 221 and the reflecting mirror 224. A half wave plate 211 is disposed between the first PBS 201 and the second PBS 221.

The distance Δd3 between the partial reflecting mirror 226 and the reflecting mirror is set so that it assumes a relation to the coherence length Lc of the light from the light source expressed in (5) below.

$$\Delta d3 \geq Lc/2 \quad (5)$$

The coherence length Lc can be approximated as expressed in (4).

For instance, when the dominant wavelength λ and the wavelength width Δλ of the light from the light source are respectively 530 nm and 0.1 nm, Δd3, should be set equal to or greater than 1.4 mm. An incoherent relationship is assumed for light fluxes to be superimposed upon one another so as to effectively reduce speckles.

A circularly polarized light flux from the laser light source device 100 enters the left side surface of the first PBS 201. If the light flux from the laser light source device 100 is linearly polarized light, it will need to be converted to circularly polarized light via a quarter wave plate so that the circularly polarized light flux resulting from the conversion, entering through the left side surface of the first PBS 201 will contain both a P polarized light component and an S polarized light component in substantially equal amounts.

The P polarized light component in the light having entered the first PBS 201 is transmitted through a polarization splitter portion 201*a* and exits the first PBS 201 through its right side surface. The S polarized light component in the light having entered the first PBS 201 is reflected at the polarization splitter portion 201*a* and exits the first PBS 201 through the top surface thereof.

Part of the polarized light component having exited the first PBS 201 through its top surface is reflected at the partial reflecting mirror 206 and reenters the first PBS 201 through the top surface of the first PBS 201. Another part of the polarized light component having exited the first PBS 201 through its top surface is transmitted through the partial reflecting mirror 206 and reaches the reflecting mirror 202. Upon reaching the reflecting mirror 202, it is reflected and travels back toward the partial reflecting mirror 206. Part of the light having traveled from the reflecting mirror 202 is transmitted through the partial reflecting mirror 206 to reenter the first PBS 201 through the top surface of the first PBS 201. At the partial reflecting mirror 206, another part of the light having traveled from the reflecting mirror 202 is reflected yet again. Thus, light reflected multiple times, resulting from repeated reflection of light back and forth between the partial reflecting mirror 206 and the reflecting mirror 202, reenters the first PBS 201 through the top surface of the first PBS 201. Through this multiple reflection, the amount of incoherent light increases.

The polarized light component having reentered the first PBS 201 through the top surface thereof will have been transmitted through the quarter wave plate 203 twice and thus will have been converted from the S polarized light component to the P polarized light component. The P polarized light component resulting from the conversion is then transmitted through the polarization splitter portion 201*a* and exits the first PBS 201 through the bottom surface thereof.

The polarized light component having exited the first PBS 201 through its bottom surface is reflected at the reflecting mirror 204 and reenters the first PBS 201 through the bottom surface of the first PBS 201. The polarized light component, having reentered the first PBS 201 yet again will have been transmitted through the quarter wave plate 205 twice and thus will have been converted from the P polarized light component to the S polarized light component. This S polarized light component is reflected at the polarization splitter portion 201*a* and exits the first PBS 201 through the right side surface thereof.

In the speckle reducing device structured as described above, the light constituted with the P polarized light component and the light constituted with the S polarized light component exit the first PBS 201 through its right side surface. The length of the optical path through which the S polarized light component travels is greater than the length of the optical path of the P polarized light component by at least a distance (d) representing one round trip between the partial reflecting mirror 206 and the reflecting mirror 204. In addition, since light is reflected multiple times back and forth repeatedly between the partial reflecting mirror 206 and the reflecting mirror 202, as described above, countless speckle patterns with varying optical path lengths are formed as expressed; d+2 Δd1×n (n=0, 1, 2, . . . ). As a result, the speckle noise contrast is reduced.

The light having exited the first PBS 201 through its right side surface enters the second PBS 201 through the left side surface thereof via the half wave plate 211. Via the half wave plate 211 the polarizing direction is rotated by 90° and, as a result, the S polarized light component and the P polarized component in the incident light are switched relative to the polarization splitter surface 221*a* of the second PBS 221. Thus, countless speckle patterns are formed with the P polarized light component, whereas the S polarized light component assumes a single speckle pattern.

The light having entered the second PBS 221 through the left side surface thereof travels through optical paths similar to those in the first PBS 201. Namely, the optical path of the light, initially entering the second PBS 221 as the S polarized light component, is longer than the optical path of the light that initially enters the second PBS 221 as the P polarized light component by at least a length (d) equivalent to a round trip between the reflecting mirror 222 and the reflecting mirror 224. In addition, since light is multiply reflected back and forth repeatedly between the reflecting mirror 226 and the reflecting mirror 224, as described above, countless speckle patterns with varying optical path lengths are formed as expressed; d+2 Δd3×n (n=0, 1, 2, . . . ). As a result, the speckle noise contrast is reduced.

It is to be noted that the configuration shown in FIG. 2 includes the PBSs 201 and 221 each assuming rectangular parallelopiped shape and the quarter wave plates 203, 205, 223 and 225, a half wave plate 211, the partial reflecting mirrors 206 and 226 and the reflecting mirrors 202, 204, 222 and 224 each disposed perpendicular to an optical axis so as to allow light to enter or exit the corresponding device surface perpendicular to the particular device surface. The individual components are set with this positional arrangement so as to minimize the extent of angular widening that is bound to occur when different polarized light components, separated form each other by splitting the light at the polarization splitter surface 201a or 221a of the PBS 201 or 221, are combined on a single optical path.

While the speckle reducing device 200 described above includes structural blocks, in each of which two different optical path lengths are achieved, disposed side-by-side over two stages, the speckle reducing device may instead assume a single-stage. However, it will be obvious that the speckle noise contrast can be reduced more effectively via structural blocks disposed over a greater number of stages.

The following advantages are achieved through the embodiment described above.

(1) The speckle reducing device includes the PBS 201, which splits incident light into first-component light (S polarized light component) and second-component light (P polarized light component) at its polarization splitter portion 201a and outputs the first-component light (S polarized light component) and the second-component light (P polarized light component) along different directions, the reflecting mirror 202 that reflects the first-component light (S polarized light component) having exited the PBS 201 to allow the light to reenter the PBS 201, the partial reflecting mirror 206 disposed between the reflecting mirror 202 and the PBS 201, via which the light traveling back and forth between the reflecting mirror 202 and the partial reflecting mirror 206 is reflected multiple times before reentry to the PBS 201, the quarter wave plate 203 disposed between the partial reflecting mirror 206 and the PBS 201, via which the light to reenter the PBS 201 is converted to second-component light (P polarized light component), the reflecting mirror 204 that reflects the second-component light (P polarized light component) having reentered the PBS 201 and then exited the PBS 201 so as to allow the light to reenter the PBS 201 yet again, and the quarter wave plate 205 disposed between the reflecting mirror 204 and the PBS 201, via which the light to reenter the PBS 201 yet again is converted to first-component light (S polarized light component). At this speckle reducing device, the second-component light (P polarized light component) obtained by splitting the incident light and the first-component light (S polarized light component) having reentered the PBS 201 yet again, are made to exit the PBS 201 along the same direction. As a result, a speckle reducing device that reduces speckles by creating different optical path lengths can be provided as a compact unit.

(2) At the speckle reducing device described in (1) above, the reflecting mirror 202, the quarter wave plate 203, the reflecting mirror 204 and the quarter wave plate 205 are each disposed so that incident light enters the corresponding device surface perpendicular to the particular device surface. As a result, the extent of angular spreading that is bound to occur when different polarized light components, having been separated from each other at the polarization splitter surface 201a of the PBS 201, join each other on a single optical path can be minimized.

In the embodiment described above, the S polarized light component in the incident light having entered each PBS is multiply reflected at the reflecting mirror and the partial reflecting mirror. As an alternative, the P polarized component in the incident light may be multiply reflected by a reflecting mirror and a partial reflecting mirror.

(Variation 6)

Figure 9:
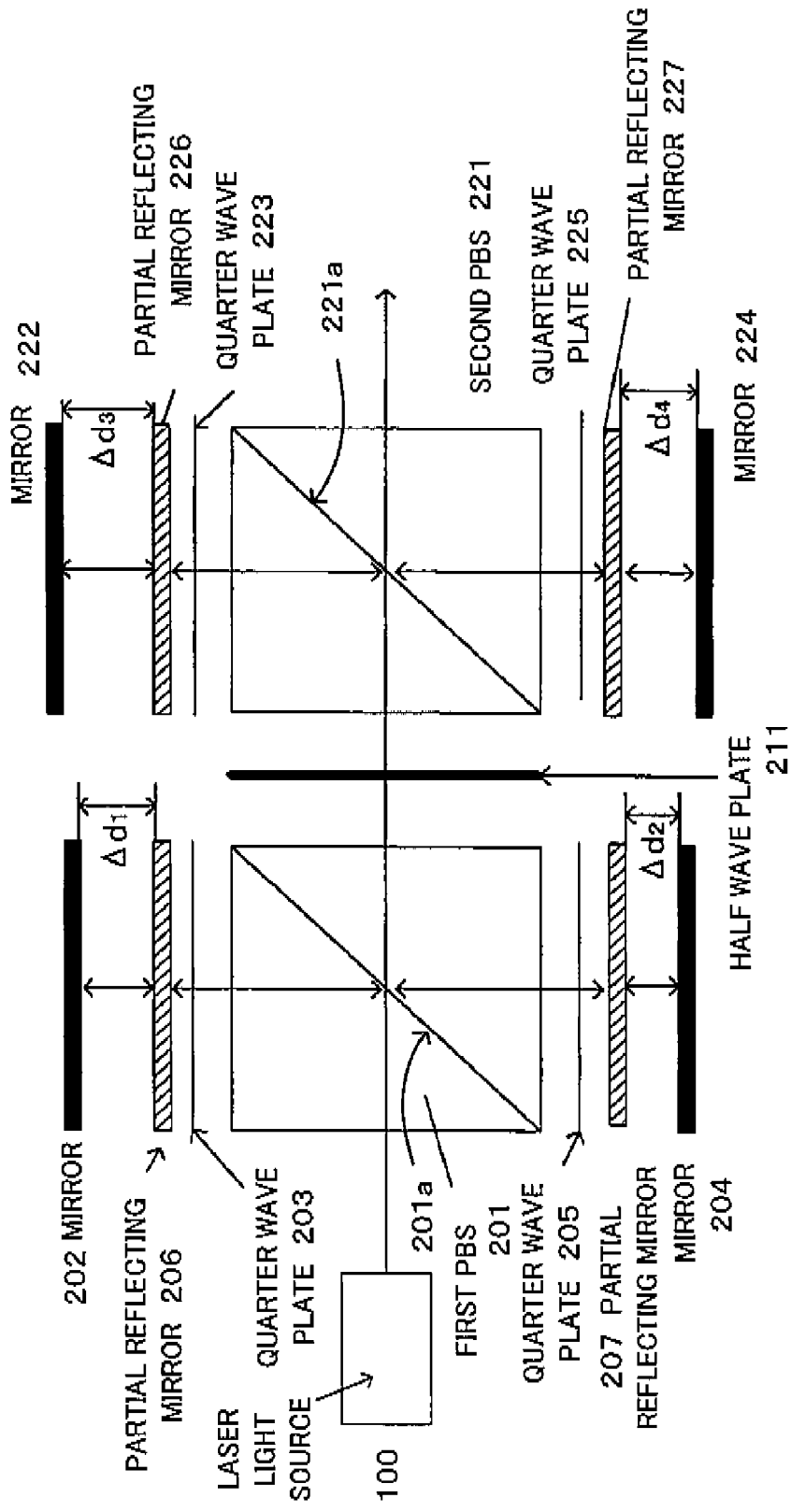
FIG. 9 presents examples of optical systems that may be included in a speckle reducing device achieved in variation 6.

FIG. 9 presents examples of optical systems that may be included in the speckle reducing device achieved in variation 6. The structure differs from that shown in FIG. 8 in that a partial reflecting mirror 207 is disposed between the quarter wave plate 205 and the reflecting mirror 204 below the first PBS 201. The partial reflecting mirror 207, too, is constituted with a non-polarizing half mirror as explained earlier, so as to ensure that no variance in the reflectance (transmittance) occurs due to a difference in the polarizing direction. The partial reflecting mirror 207 and the reflecting mirror 204 are set apart from each other by a distance Δd2.

The structure achieved in variation 6 further includes a partial reflecting mirror 227 disposed between the quarter wave plate 225 and the reflecting mirror 224 below the second PBS 221. The partial reflecting mirror 227, too, is constituted with a non-polarizing half mirror as explained earlier, so as to ensure that no variance in the reflectance (transmittance) occurs due to a difference in the polarizing direction. The partial reflecting mirror 227 and the reflecting mirror 224 are set apart from each other by a distance Δd4.

The distance Δd2 is set so as to achieve a relation to the coherence length Lc of the light from the light source expressed in (6) below.

$$\Delta d2 \geq Lc/2 \qquad (6)$$

In addition, the distance Δd4 is set so as to achieve a relation to the coherence length Lc of the light from the light source expressed in (7) below.

$$\Delta d4 \geq Lc/2 \qquad (7)$$

The coherence length Lc can be approximated as expressed in (4).

In variation 6, Δd1 through Δd4 are set to values different from one another. An incoherent relationship is assumed for light fluxes to be superimposed upon one another so as to reduce speckles even more effectively.

(Variation 7)

Figure 10:
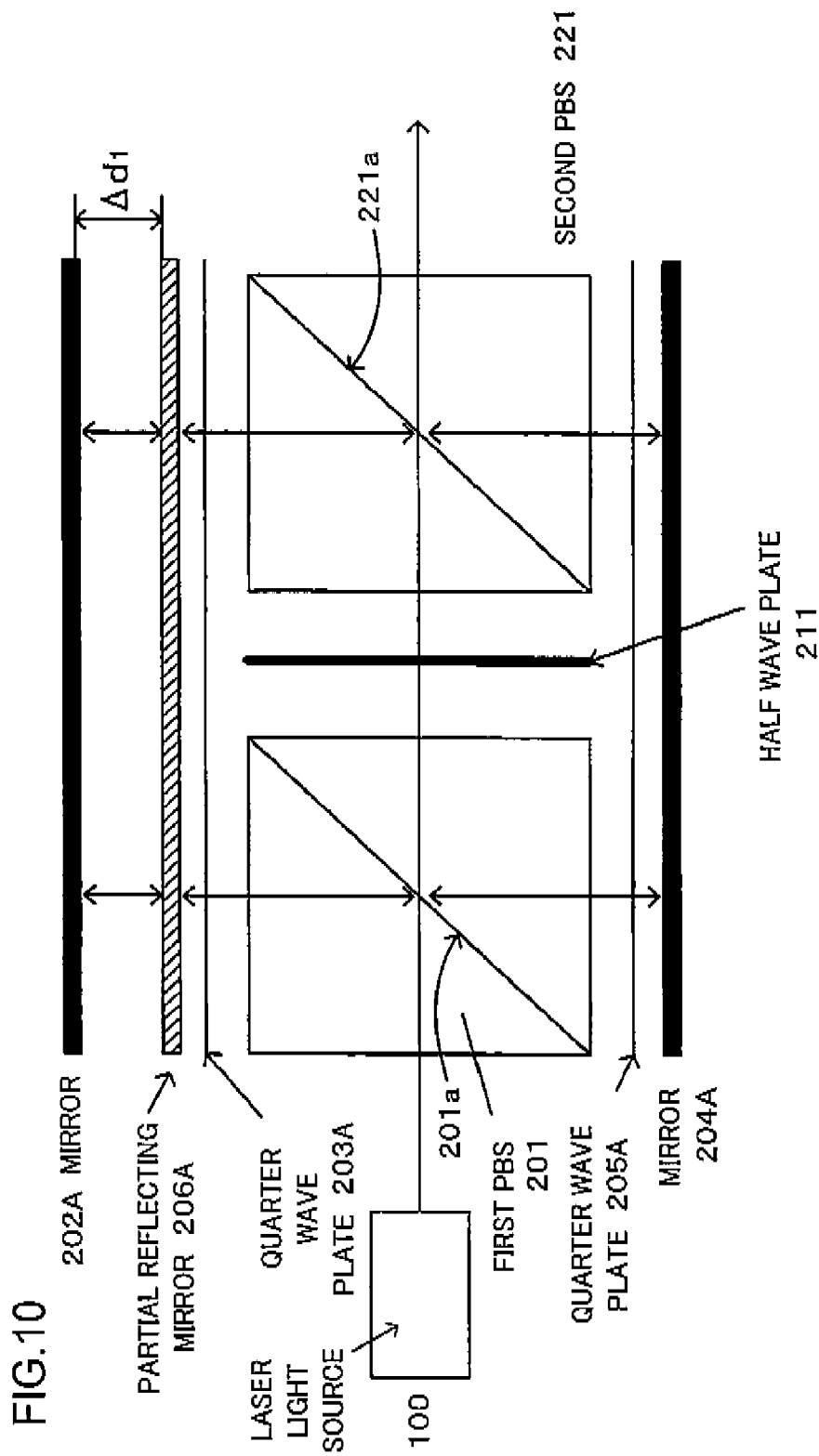
FIG. 10 presents examples of optical systems that may be included in a speckle reducing device achieved in variation 7.

A common reflecting mirror and the like may be disposed to be used in conjunction with both the first block and the second block. FIG. 10 presents examples of optical systems that may be included in the speckle reducing device achieved in variation 7. The structure shown in FIG. 10 differs from that shown in FIG. 8 in that a reflecting mirror 202A, a reflecting mirror 204A, a partial reflecting mirror 206A, a quarter wave plate 203A and a quarter wave plate 205A are all commonly used in conjunction with both the first block and the second block. The partial reflecting mirror 206A is set apart from the reflecting mirror 202A by a distance Δd1.

The speckle reducing device in variation 7, which includes common members shared by the first block and the second block, requires fewer components and can be manufactured through an assembly process executed at lower cost. For instance, a speckle reducing device adopting a structure with the quarter wave plates and the PBSs fitted inside a casing to which the mirrors are vapor-deposited, can be manufactured through fewer assembly steps.

(Variation 8)

Figure 11:
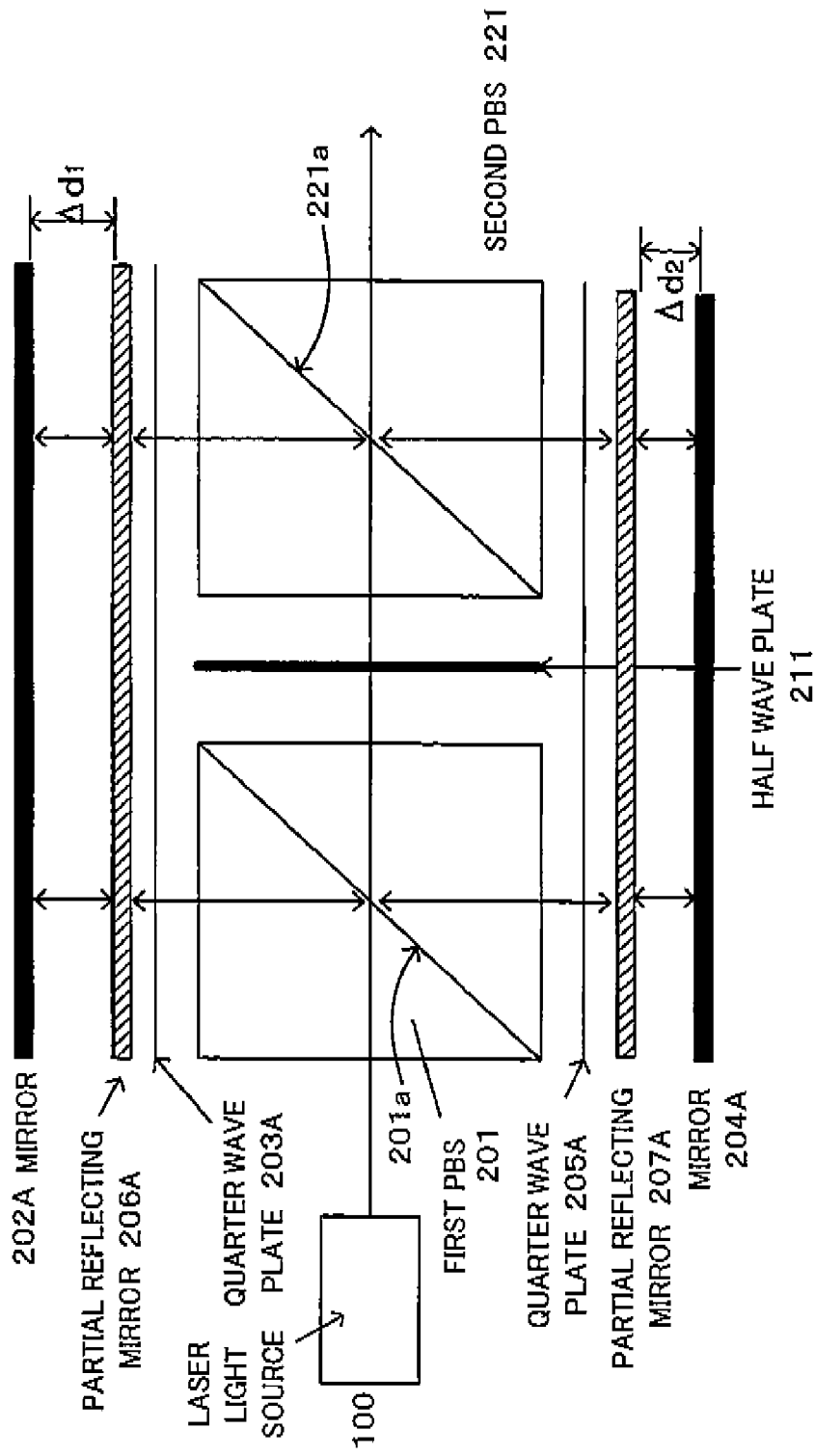
FIG. 11 presents examples of optical systems that may be included in a speckle reducing device achieved in variation 8.

FIG. 11 presents examples of optical systems that may be included in the speckle reducing device achieved in variation 8. The structure differs from that shown in FIG. 10 in that it includes a common partial reflecting mirror 207A, which is used in conjunction with both the first block and the second block. The partial reflecting mirror 207A and the reflecting mirror 204A are set apart from each other by a distance Δd2.

The speckle reducing device in variation 8, which includes common members shared by the first block and the second block, as does the speckle reducing device in variation 7 requires fewer components and can be manufactured through an assembly process executed at lower cost.

(Variation 9)

Figure 12:
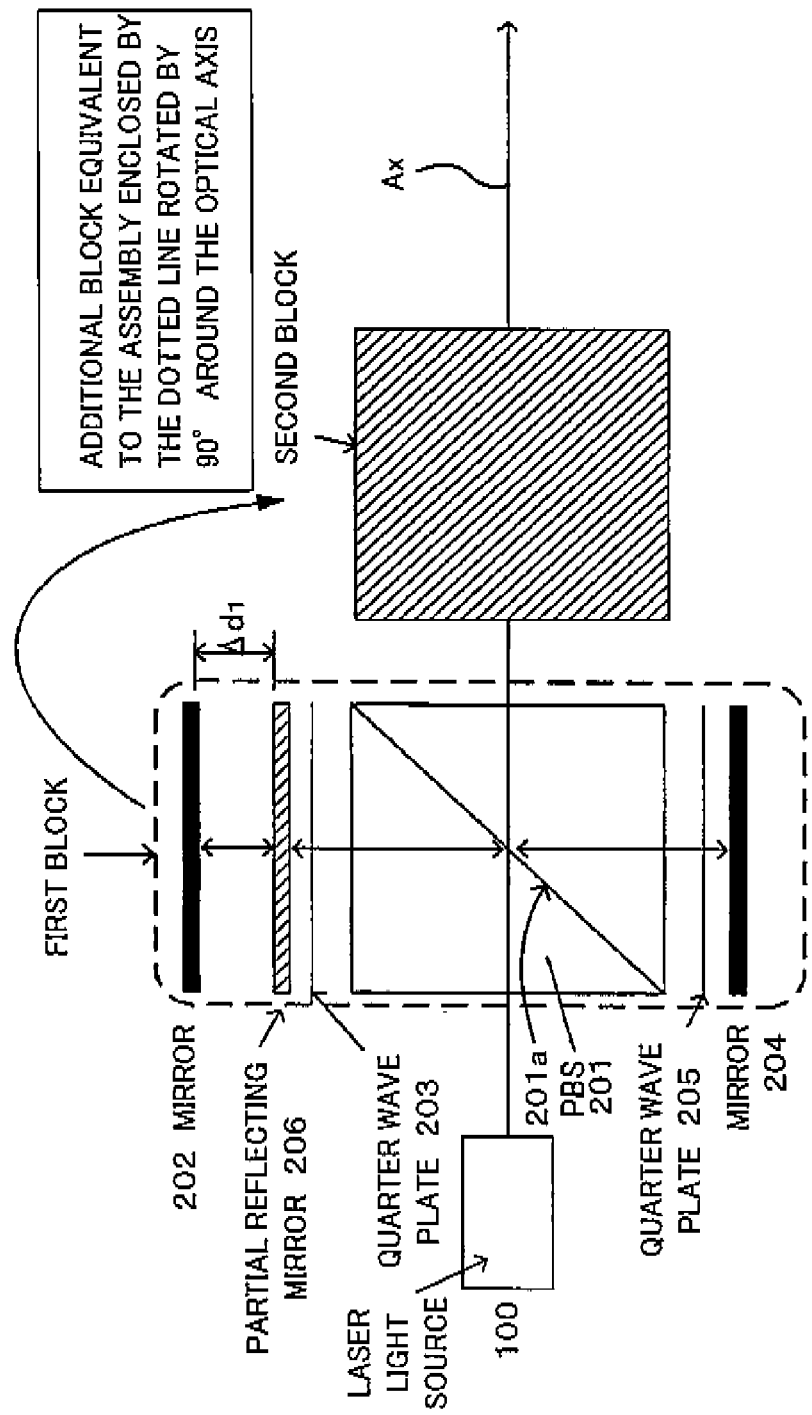
FIG. 12 presents examples of optical systems that may be included in a speckle reducing device achieved in variation 9.

The second block in FIG. 8 may be rotated substantially by 90° around an optical axis Ax relative to the first block, so as to tilt the direction in which the light exiting the first PBS 201 through the right side surface thereof is polarized by approximately 90° relative to the polarization splitter surface of the second PBS in the second block. FIG. 12 presents examples of optical systems that may be included in the speckle reducing device achieved in variation 9.

In variation 9, the P polarized light component and the S polarized light component in the light containing a plurality of speckle patterns, which exits the first block through its right side surface, will have been switched relative to the polarization splitter surface of the second PBS. As a result, no half wave plate needs to be disposed between the first block and the second block.

(Variation 10)

Figure 13:
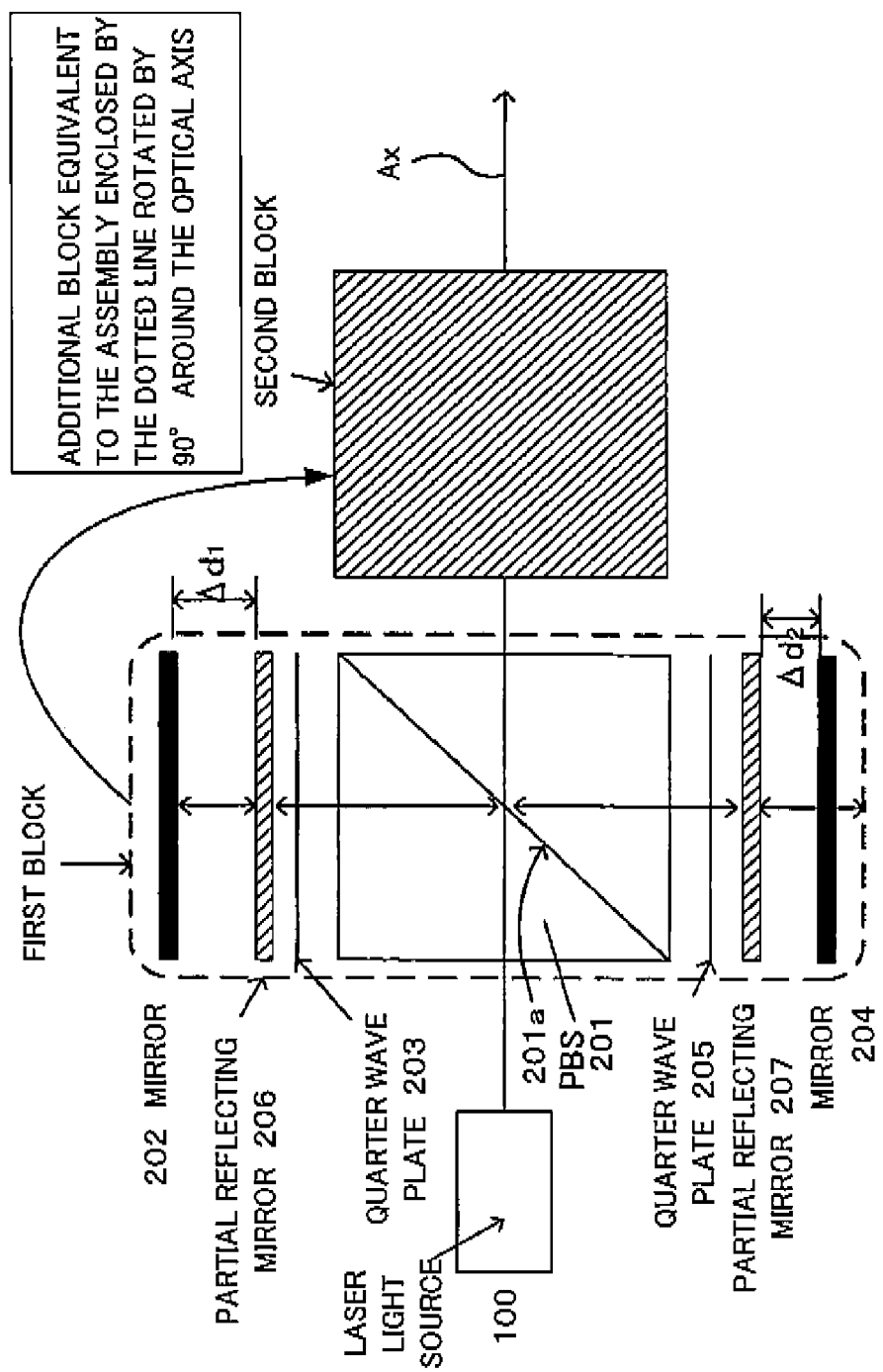
FIG. 13 presents examples of optical systems that may be included in a speckle reducing device achieved in variation 10.

The second block in FIG. 9 may be rotated substantially by 90° around an optical axis Ax relative to the first block, so as to tilt the direction in which the light exiting the first PBS 201 through the right side surface thereof is polarized by approximately 90° relative to the polarization splitter surface of the second PBS in the second block. FIG. 13 presents examples of optical systems that may be included in the speckle reducing device achieved in variation 10.

In variation 10, the P polarized light component and the S polarized light component in the light containing a plurality of speckle patterns, which exits the first block through its right side surface, will have been switched relative to the polarization splitter surface of the second PBS. As a result, no half wave plate needs to be disposed between the first block and the second block.

(Variation 11)

A speckle reducing device may include a first block adopting a structure such as that shown in FIG. 8 and a second block adopting a structure such as that shown in FIG. 9 in combination or may include a first block adopting the structure shown in FIG. 9 and the second block adopting the structure shown in FIG. 8 in combination.

(Variation 12)

Figure 14:
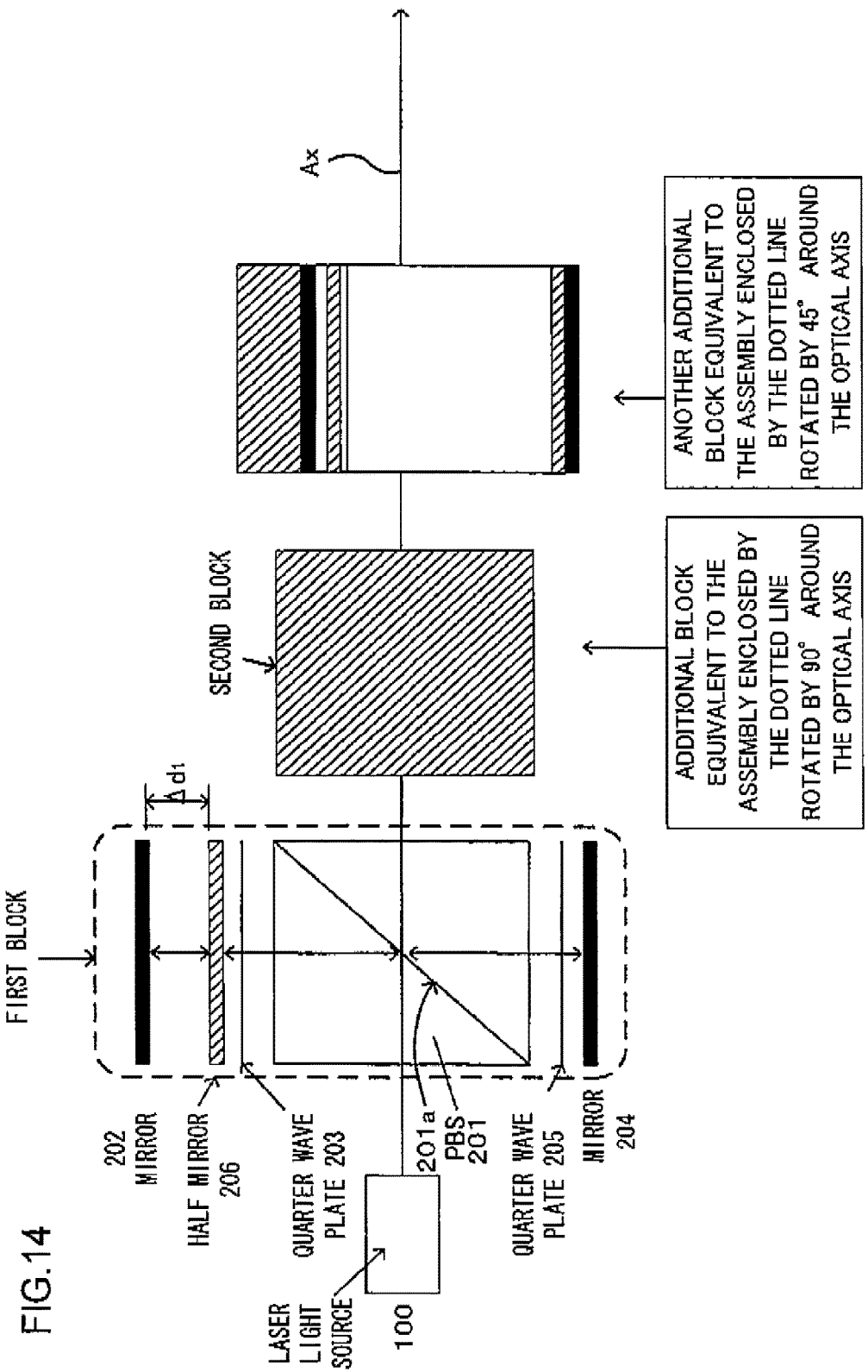
FIG. 14 presents examples of optical systems that may be included in a speckle reducing device achieved in variation 12.

While the speckle reducing device 200 has been described in reference to a two-stage structure in which a plurality of different optical path lengths are achieved at each stage, the speckle reducing device 200 may instead include such optical blocks disposed side-by-side over three or four stages, so as to tilt the direction along which light exiting the second block through the right side surface of the second PBS 221 is polarized by approximately 45° relative to the polarization splitter surface of a third PBS in the third block. FIG. 14 presents examples of optical systems that may be included in the speckle reducing device achieved in variation 12.

In variation 12, the light containing a plurality of speckle patterns, which exits the second block through the right side surface thereof and subsequently enters the third block, includes both the P polarized light component and the S polarized light component in substantially equal amounts. As a result, the P polarized light component and the S polarized light component are each further split into two, thereby further increasing the incoherent light components, which makes it possible to further reduce the speckle noise contrast.

The speckle reducing devices achieved in the first and second embodiments as described above allow for the following variations.

(Variation 13)

In the examples described above, a quarter wave plate and a reflecting mirror (or a partial reflecting mirror) are disposed set apart from an end surface of each PBS. However, the quarter wave plate and the reflecting mirror (or the partial reflecting mirror) may instead be disposed so as to contact the end surface of the PBS.

(Variation 14)

While the speckle reducing devices 200 described above invariably include polarization splitter elements constituted with PBSs, the present invention may instead be adopted in conjunction with a polarization splitter element constituted with a wire grid.

(Variation 15)

While the reflection-type display element 500 is used as a light valve for the projector in the description provided above, the present invention may be adopted in a structure that includes a transmission-type display element. In addition, while the reflection-type display element 500 described above is constituted with a DMD, the present invention may be adopted in conjunction with an MEMS (micro-electric machine system) mirror element or a reflection type liquid crystal display element.

It is to be noted that in a projector that includes a light valve constituted with a liquid crystal display element, a polarization conversion element should be disposed between the speckle reducing device 200 and the condensing optical system 300, so as to convert the light constituted with the P polarized light component and the S polarized light component, output from the speckle reducing device 200, to light constituted with a single polarized light component via the polarization conversion element. Since the NA of the light output from the speckle reducing device 200 is very small, the light can be converted via the polarization conversion element with hardly any decrease in the amount of light attributable to an increase in etendue.

(Variation 16)

While an explanation has been given in reference to examples in which the present invention is adopted in illuminating optical systems mounted at projectors, the present invention is not limited to such applications and it may also be adopted in an illuminating optical system of a microscope or an illuminating optical system in a stepper exposure apparatus.

The above described embodiments are examples, and various modifications can be made without departing from the scope of the invention.

What is claimed is:
1. An optical device, comprising:
 a first polarization splitter unit that splits incident light into first light flux that has first polarized light and second light flux that has second polarized light, and outputs the first light flux and the second light flux;
 a first reflecting unit that reflects the first light flux output from the first polarization splitter unit to the first polarization splitter unit;
 a first conversion unit disposed between the first polarization splitter unit and the first reflecting unit, which converts the first polarized light of the first light flux to the second polarized light;

a second reflecting unit that reflects the first light flux converted to the second polarized light, and which was output from the first polarization splitter unit, entered the first polarization splitter unit and was output from the first polarization splitter unit, to the first polarization splitter unit; and a second conversion unit disposed between the first polarization splitter unit and the second reflecting unit, which converts the second polarized light of the first light flux to the first polarized light, wherein the first polarization splitter unit outputs the first light flux, which was reflected by the second reflecting unit and entered the first polarization splitter unit, and the second light flux along a direction in which the incident light entered the first polarization splitter unit, the optical device further comprising:

a second polarization splitter unit that splits the first light flux and the second light flux, which was output from the first polarization splitter unit and entered the second polarization splitter unit, into third light flux and fourth light flux; and a third conversion unit disposed between the first polarization splitter unit and the second polarization splitter unit, which converts the first polarized light and the second polarized light included in the first light flux and the second light flux to circularly polarized light.

2. The optical device according to claim 1, wherein:
surfaces of the first reflecting unit, the first conversion unit, the second reflecting unit, and the second conversion unit are disposed along the direction in which the incident light entered the first polarization splitter unit.

3. The optical device according to claim 1, wherein:
the first conversion unit, the second conversion unit and the third conversion unit are quarter wave plates.

4. The optical device according to claim 1, wherein:
the first polarization splitter unit outputs the first light flux, having been reflected to the first polarization splitter unit by the second reflecting unit, and the second light flux from an output surface different from a surface at which the incident light enters the first polarization splitter unit.

5. The optical device according to claim 1, wherein:
a distance between the surface of first reflecting unit and the first polarization splitter unit is the same as a distance between the surface of second reflecting unit and the first polarization splitter unit.

6. A speckle reducing device that reduces speckle occurred by the incident light, configured as the optical device according to claim 1.

7. A projector, comprising:
a laser light source; and
an optical device according to claim 1,
wherein light emitted from the laser light source enters the optical device.

* * * * *